(12) United States Patent
Mima

(10) Patent No.: US 10,582,170 B2
(45) Date of Patent: Mar. 3, 2020

(54) VIDEO DISPLAY DEVICE AND VIDEO DISPLAY METHOD

(71) Applicant: Panasonic Intellectual Property Management Co., Ltd., Osaka (JP)

(72) Inventor: Kunihiro Mima, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/508,702

(22) Filed: Jul. 11, 2019

(65) Prior Publication Data
US 2020/0021785 A1   Jan. 16, 2020

(30) Foreign Application Priority Data

Jul. 13, 2018   (JP) .................................. 2018-133633

(51) Int. Cl.
*H04N 9/31*   (2006.01)
*H04N 7/01*   (2006.01)
*H04N 9/64*   (2006.01)

(52) U.S. Cl.
CPC ......... *H04N 9/3182* (2013.01); *H04N 7/0127* (2013.01); *H04N 9/3191* (2013.01); *H04N 9/646* (2013.01)

(58) Field of Classification Search
CPC .......... H04N 7/0127; H04N 7/01; H04N 9/31; H04N 9/3182; H04N 9/3191; H04N 9/646; H04N 9/3188; G06T 5/001; G09G 3/2051; G09G 2320/0271; G09G 3/2055

USPC ............... 348/441, 459, 574, 671, 739, 744; 382/274; 345/596, 690, 605
See application file for complete search history.

(56) References Cited

U.S. PATENT DOCUMENTS

| | | | |
|---|---|---|---|
| 6,697,084 B1 | 2/2004 | Ohmae et al. | |
| 2003/0202000 A1* | 10/2003 | Kudo | G09G 3/2051 345/690 |
| 2004/0036799 A1 | 2/2004 | Weitbruch et al. | |
| 2009/0295842 A1* | 12/2009 | Okada | G09G 3/3406 345/690 |

(Continued)

FOREIGN PATENT DOCUMENTS

| | | |
|---|---|---|
| JP | 2000-259127 | 9/2000 |
| JP | 2003-309782 | 10/2003 |

(Continued)

*Primary Examiner* — Sherrie Hsia
(74) *Attorney, Agent, or Firm* — Wenderoth, Lind & Ponack, L.L.P.

(57) ABSTRACT

A video display device includes: a receiver receiving video information including a bit string which defines a gradation value of an input image with a first frame rate; a video generator generating output images including multiple frames corresponding to a one-frame input image, based on the received video information; and a display displaying the generated output images for each frame rate. The bit string includes an upper bit, a middle bit, and a lower bit which are arranged in descending order therein. The upper bit corresponds to a number of gradations per frame of the output images. The video generator varies the gradation value among multiple frames in the output images according to the middle bit of the input image, and performs spatial dithering to correct the output images according to the lower bit of the input image.

10 Claims, 17 Drawing Sheets

(56) References Cited

U.S. PATENT DOCUMENTS

2019/0004406 A1  1/2019  Fuchikami

FOREIGN PATENT DOCUMENTS

| JP | 2004-133400 | 4/2004 |
| JP | 2014-44383 | 3/2014 |
| WO | 2017/110086 | 6/2017 |

* cited by examiner

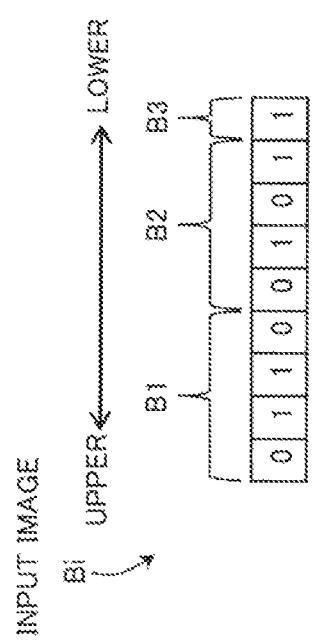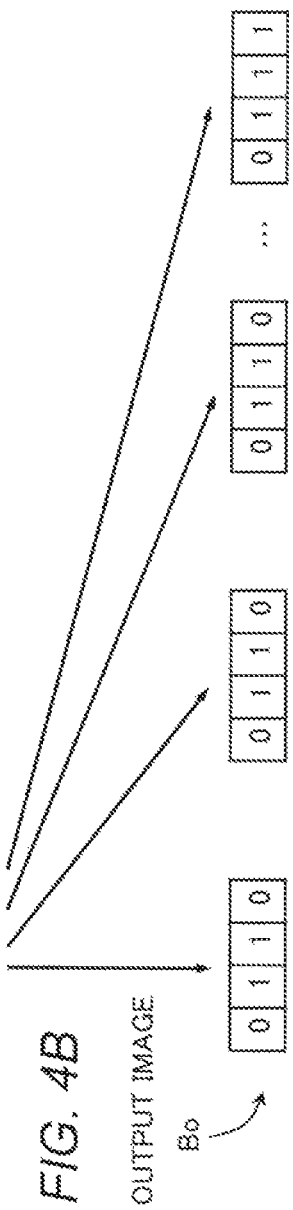
FIG. 4A
FIG. 4B

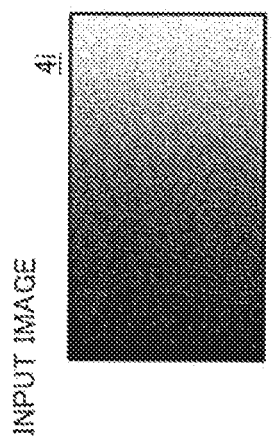
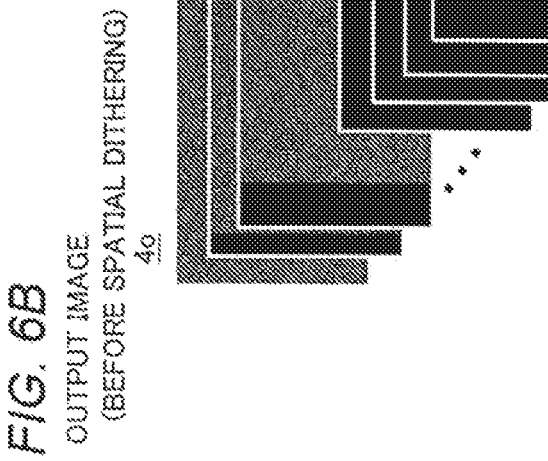
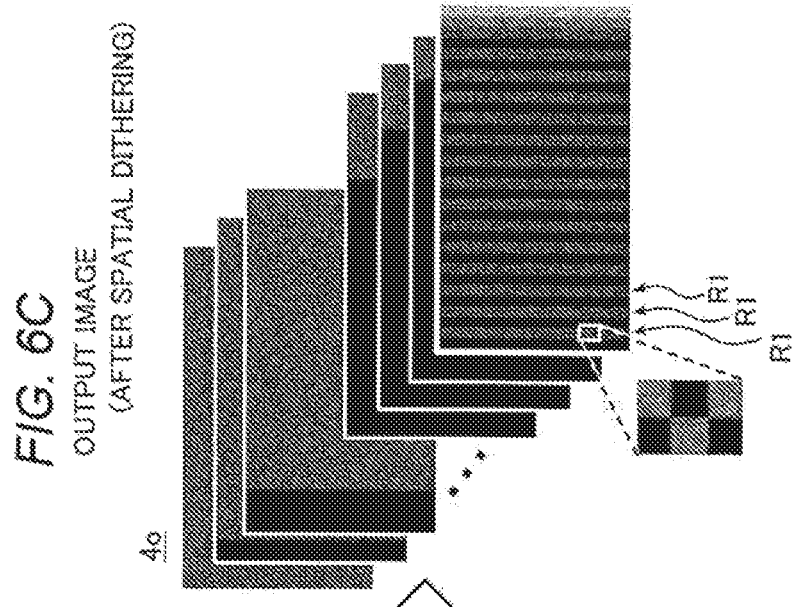
FIG. 6A INPUT IMAGE
FIG. 6B OUTPUT IMAGE (BEFORE SPATIAL DITHERING)
FIG. 6C OUTPUT IMAGE (AFTER SPATIAL DITHERING)

FIG. 7

| (B1, B2) | 0 | 1 | 2 | 3 | 4 | ... | 100 | 101 | 102 | 103 | ... | 236 | 237 | 238 | 239 | 240 |
|---|---|---|---|---|---|---|---|---|---|---|---|---|---|---|---|---|
| VARIATION VALUE P | | | | | | | VARIED GRADATION VALUE | | | | | | | | | |
| 0 | 0 | 0 | 0 | 0 | 0 | | 6 | 6 | 6 | 6 | | 14 | 14 | 14 | 14 | 15 |
| 1 | 0 | 0 | 0 | 0 | 0 | | 6 | 6 | 6 | 6 | | 14 | 14 | 14 | 15 | 15 |
| 2 | 0 | 0 | 0 | 0 | 0 | | 6 | 6 | 6 | 6 | | 14 | 14 | 15 | 15 | 15 |
| 3 | 0 | 0 | 0 | 0 | 0 | | 6 | 6 | 6 | 6 | | 14 | 15 | 15 | 15 | 15 |
| 4 | 0 | 0 | 0 | 0 | 0 | | 6 | 6 | 6 | 6 | | 15 | 15 | 15 | 15 | 15 |
| 5 | 0 | 0 | 0 | 0 | 0 | | 6 | 6 | 6 | 6 | | 15 | 15 | 15 | 15 | 15 |
| 6 | 0 | 0 | 0 | 0 | 0 | | 6 | 6 | 6 | 6 | | 15 | 15 | 15 | 15 | 15 |
| 7 | 0 | 0 | 0 | 0 | 0 | | 6 | 6 | 6 | 6 | | 15 | 15 | 15 | 15 | 15 |
| 8 | 0 | 0 | 0 | 0 | 0 | | 6 | 6 | 6 | 6 | | 15 | 15 | 15 | 15 | 15 |
| 9 | 0 | 0 | 0 | 0 | 0 | | 6 | 6 | 6 | 7 | | 15 | 15 | 15 | 15 | 15 |
| 10 | 0 | 0 | 0 | 0 | 0 | | 7 | 7 | 7 | 7 | | 15 | 15 | 15 | 15 | 15 |
| 11 | 0 | 0 | 0 | 0 | 0 | | 7 | 7 | 7 | 7 | | 15 | 15 | 15 | 15 | 15 |
| 12 | 0 | 0 | 0 | 0 | 0 | | 7 | 7 | 7 | 7 | | 15 | 15 | 15 | 15 | 15 |
| 13 | 0 | 0 | 0 | 0 | 1 | | 7 | 7 | 7 | 7 | | 15 | 15 | 15 | 15 | 15 |
| 14 | 0 | 0 | 1 | 1 | 1 | | 7 | 7 | 7 | 7 | | 15 | 15 | 15 | 15 | 15 |
| 15 | 0 | 1 | 1 | 1 | 1 | | 7 | 7 | 7 | 7 | | 15 | 15 | 15 | 15 | 15 |
| SUM | 0 | 1 | 2 | 3 | 4 | ... | 100 | 101 | 102 | 103 | ... | 236 | 237 | 238 | 239 | 240 |

TIME →

| DARK PIXEL | 0 | 1 | 2 | 3 | 4 | ... | 200 | 201 | 202 | 203 | ... | 476 | 477 | 478 | 479 | 480 |
|---|---|---|---|---|---|---|---|---|---|---|---|---|---|---|---|---|
| (B1,B2,B3) | 0 | 0 | 1 | 1 | 2 | ... | 100 | 100 | 101 | 101 | ... | 238 | 238 | 239 | 239 | 240 |
| (B1,B2) | 0 | 0 | 1 | 1 | 2 | ... | 100 | 100 | 101 | 101 | ... | 238 | 238 | 239 | 239 | 240 |
| B3 | 0 | 1 | 0 | 1 | 0 | ... | 0 | 1 | 0 | 1 | ... | 0 | 1 | 0 | 1 | 0 |
| CORRECTION VALUE Q | 0 | 0 | 0 | 0 | 0 | ... | 0 | 0 | 0 | 0 | ... | 0 | 0 | 0 | 0 | 0 |

| VARIATION VALUE P | | | | | | VARIED GRADATION VALUE AFTER CORRECTION | | | | | | | | | | |
|---|---|---|---|---|---|---|---|---|---|---|---|---|---|---|---|---|
| 0 | 0 | 0 | 0 | 0 | 0 | ... | 6 | 6 | 6 | 6 | ... | 14 | 14 | 14 | 14 | 15 |
| 1 | 0 | 0 | 0 | 0 | 0 | ... | 6 | 6 | 6 | 6 | ... | 14 | 14 | 15 | 15 | 15 |
| 2 | 0 | 0 | 0 | 0 | 0 | ... | 6 | 6 | 6 | 6 | ... | 15 | 15 | 15 | 15 | 15 |
| 3 | 0 | 0 | 0 | 0 | 0 | ... | 6 | 6 | 6 | 6 | ... | 15 | 15 | 15 | 15 | 15 |
| 4 | 0 | 0 | 0 | 0 | 0 | ... | 6 | 6 | 6 | 6 | ... | 15 | 15 | 15 | 15 | 15 |
| 5 | 0 | 0 | 0 | 0 | 0 | ... | 6 | 6 | 6 | 6 | ... | 15 | 15 | 15 | 15 | 15 |
| 6 | 0 | 0 | 0 | 0 | 0 | ... | 6 | 6 | 6 | 6 | ... | 15 | 15 | 15 | 15 | 15 |
| 7 | 0 | 0 | 0 | 0 | 0 | ... | 6 | 6 | 6 | 6 | ... | 15 | 15 | 15 | 15 | 15 |
| 8 | 0 | 0 | 0 | 0 | 0 | ... | 6 | 6 | 6 | 6 | ... | 15 | 15 | 15 | 15 | 15 |
| 9 | 0 | 0 | 0 | 0 | 0 | ... | 6 | 6 | 6 | 6 | ... | 15 | 15 | 15 | 15 | 15 |
| 10 | 0 | 0 | 0 | 0 | 0 | ... | 6 | 6 | 6 | 7 | ... | 15 | 15 | 15 | 15 | 15 |
| 11 | 0 | 0 | 0 | 0 | 0 | ... | 7 | 7 | 7 | 7 | ... | 15 | 15 | 15 | 15 | 15 |
| 12 | 0 | 0 | 0 | 0 | 0 | ... | 7 | 7 | 7 | 7 | ... | 15 | 15 | 15 | 15 | 15 |
| 13 | 0 | 0 | 0 | 0 | 0 | ... | 7 | 7 | 7 | 7 | ... | 15 | 15 | 15 | 15 | 15 |
| 14 | 0 | 0 | 0 | 0 | 1 | ... | 7 | 7 | 7 | 7 | ... | 15 | 15 | 15 | 15 | 15 |
| 15 | 0 | 0 | 1 | 1 | 2 | ... | 7 | 7 | 7 | 7 | ... | 15 | 15 | 15 | 15 | 15 |
| SUM | 0 | 0 | 1 | 1 | 2 | ... | 100 | 100 | 101 | 101 | ... | 238 | 238 | 239 | 239 | 240 |

→ TIME

FIG. 12

| (B1,B2,B3) | 0 | 1 | 2 | 3 | 4 | ... | 200 | 201 | 202 | 203 | ... | 476 | 477 | 478 | 479 | 480 |
|---|---|---|---|---|---|---|---|---|---|---|---|---|---|---|---|---|
| AVERAGE GRADATION OF BRIGHT PIXEL & DARK PIXEL | 0 | 0.5 | 1 | 1.5 | 2 | ... | 100 | 100.5 | 101 | 101.5 | ... | 238 | 238.5 | 239 | 239.5 | 240 |

VIDEO DISPLAY DEVICE AND VIDEO DISPLAY METHOD

BACKGROUND

1. Technical Field

The present disclosure relates to a video display device that displays a video, such as a moving image, and a video display method.

2. Description of the Related Art

Technologies in the field of projection mapping onto a moving object have been developed recently. It is known that if a video, such as a moving image, is projected onto a moving object, a gaze of a viewer who is watching the video moves, thus the displayed video is likely to cause a sense of discomfort because the viewer feels it is intermittent. To avoid such a sense of discomfort, in this technical field, there has been developed a technology of using a high-speed projection element, such as a digital micromirror device (DMD), to control a display pattern at high speed (for example, International Publication WO 2017/110086).

International Publication WO 2017/110086 discloses a high-speed display device that plays a moving image at high speed and with high gradation. For example, it is presumable that a moving image is projected at a frame rate of, for example, 1000 fps by creating gradation of a video by turning mirrors of a DMD ON/OFF in time division. However, in a case where a moving image is played on a moving body at such a high frame rate, the entire screen needs to be updated at the boundary between frames, and there is a limit on the number of gradations that can be created on one frame of, for example, a millisecond. Accordingly, the high-speed display device according to International Publication WO 2017/110086 represents a high-gradation image by distributing gradation values of the input image as varied gradation values to multiple frames and temporally changing as many gradation values as the number of low gradations in each frame. Accordingly, a high-speed video display to a certain degree of high gradation is achieved under various implementation restrictions such as a limit of a transmission and processing device.

SUMMARY

The present disclosure is intended to provide a video display device and a video display method capable of displaying a video at high speed and with high gradation on the video display device.

A video display device according to the present disclosure includes a receiver, a video generator, and a display. The receiver receives video information including a bit string that defines a gradation value of an input image with a first frame rate. The video generator generates a set of output images including multiple frames corresponding to a one-frame input image on the basis of the received video information. The display displays the generated output images for each frame at a second frame rate higher than the first frame rate. The bit string of the input image includes an upper bit, a middle bit, and a lower bit which are arranged in descending order therein. The upper bit corresponds to the number of gradations per frame of the output images. The video generator varies the gradation value among multiple frames in the set of the output images according to the middle bit of the input image, and performs spatial dithering to correct the output images according to the lower bit of the input image.

A video display method according to the present disclosure includes: receiving, by the receiver, video information including a bit string that defines a gradation value of an input image with a first frame rate; generating, by the video generator, a set of output images including multiple frames corresponding to a on-frame input image on the basis of the received video information; and displaying, by the display, the generated output images frame by frame at a second frame rate higher that the first frame rate. The bit string of the input image includes an upper bit, a middle bit, and a lower bit arranged in this order from the high order. The upper bit corresponds to a number of gradations per frame of the output images. The video generator varies the gradation value among multiple frames in the set of the output images according to the middle bit of the input image, and performs spatial dithering to correct the output images according to the lower bit of the input image.

The video display device and the video display method according to the present disclosure can display a video at high speed and with high gradation on the video display device.

BRIEF DESCRIPTION OF THE DRAWINGS

FIGS. 4A and 4B are diagrams for explaining respective bit strings of the input image and the output images in the video projection systems;

FIGS. 6A to 6C are diagrams for explaining a set of output images and spatial dithering correction in the video projection system;

FIG. 7 is a table illustrating a correspondence relationship between a gradation value of the input image and varied gradation values of the set of the output images;

FIG. 10 is a table showing an example of a result of correction of the varied gradation values through the spatial dithering correction;

FIG. 11 is a table showing another example of a result of correction of the varied gradation values through the spatial dithering correction;

FIG. 12 is a table showing average gradation of the results of the spatial dithering correction shown in FIGS. 10 and 11;

FIG. 12 is a table showing average gradation of the results of the spatial dithering correction shown in FIGS. 10 and 11;

DETAILED DESCRIPTION

Some embodiments will be described in detail below with reference to drawings accordingly. However, overly detailed description may be omitted. For example, detailed description of already well-known maters and overlapping description of a substantially identical configuration may be omitted. The reason of this is to prevent the following description from becoming needlessly redundant, which helps to facilitate understanding of those skilled in the art.

It is to be noted that the applicant provides the accompanying drawings and the following description to make those skilled in the art fully comprehend the present disclosure, and is not intended that these limit the principal subject of claims.

First Embodiment

A first embodiment of the present disclosure is described below with the drawings.

1. Configuration

Figure 1:
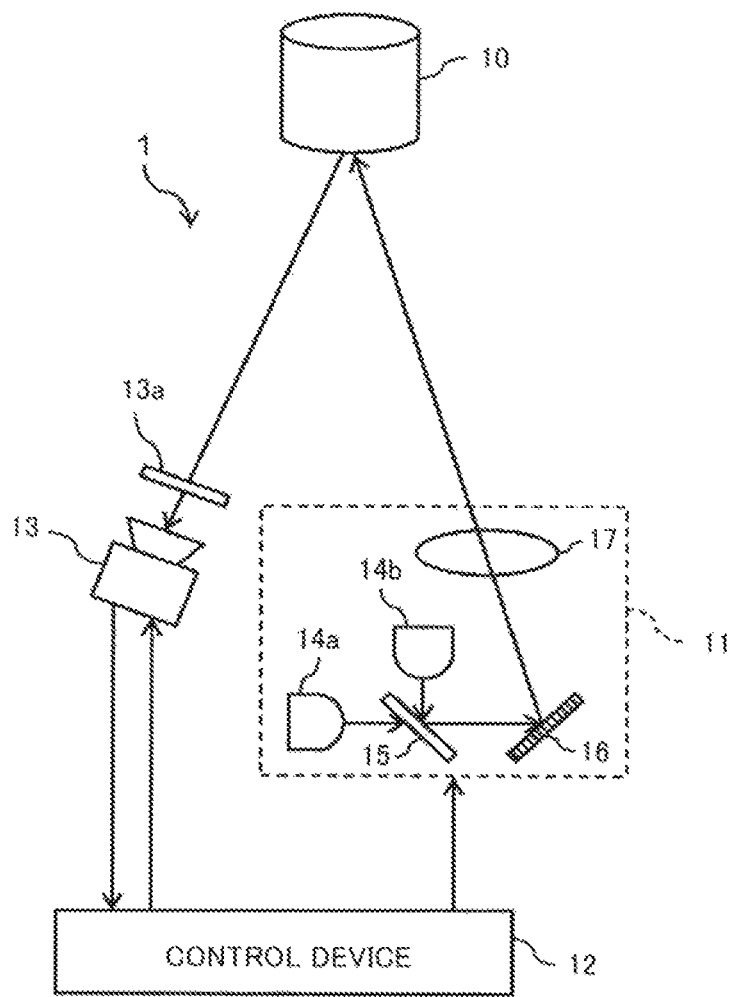
FIG. 1. is a diagram showing an outline of a video projection system according to a first embodiment of the present disclosure.

A configuration of a video projection system that is an example of a video display device according to the first embodiment is described with FIG. 1 is a diagram showing an outline of a video projection system 1 according to the present embodiment.

As shown in FIG. 1, the video projection system 1 according to the present embodiment includes a projection device 11, a control device 12, and an imaging device 13. The video projection system 1 is an example of a video display device that projects and displays a video showing various contents, etc. from the projection device 11 onto an object 10. The object 10 includes, for example, various material bodies that move while video content is projected.

The video projection system 1 in the present embodiment makes a three-dimensional measurement of the movement, deformation, etc. of the object 10 with the use of the imaging device 13 in real time while the projection device 11 is projecting a video. The control device 12 of the video projection system 1 controls video data supplied to the projection device 11 on the basis of a result of the real-time measurement so that a viewer can watch video content without distortion regardless of a change of the object 10.

The projection device 11 is, for example, a DLP projector. As shown in FIG. 1, the projection device 11 in the present embodiment includes a visible light source 14a, an infrared light source 14b, a dichroic mirror 15, a digital micromirror device (DMD) 16, and a lens optical system 17. In the present embodiment, the projection device 11 uses the visible light source 14a to project a video of visible light shown to the viewer, and uses the infrared light source 14b to project a measurement pattern for making a three-dimensional measurement of the object 10. The projection device 11 is an example of a display section in the present embodiment.

The visible light source 14a is, for example, an LED, and emits visible light including RGB light, such as white light. The infrared light source 14b is, for example, and LED, and emits invisible light of wavelength in the infrared wavelength region (hereinafter, referred to as "Ir light"). The visible light source 14a and the infrared light source 14b are not limited to an LED, and may be, for example, various light source elements, such as a semiconductor laser.

The dichroic mirror 15 is installed so as to cause visible light emitted from the visible light source 14a and Ir light emitted from the infrared light source 14b to join together and be output to the DMD 16. The DMD 16 is an example of a display device that performs spatial light modulation by ON/OFF control of reflected light by plurality of mirrors. The lens optical system 17 has an optical axis along which reflected light from the DMD 16 is output to the outside of the projection device 11.

The control device 12 controls the overall operation of the video projection system 1. For example, the control device 12 selects and excites either the visible light source 14a or the infrared light source 14b in the projection device 11, and supplies a control signal to the DMD 16. This enables the projection device 11 to modulate light from the selected light source as needed and cast the light to various points on the object 10. As a result, a per-pixel two-dimensional image can be projected onto the object 10, and, if desired, a moving image can be displayed by chronologically projecting a large number of two-dimensional images. Furthermore, the control device 12 can control an imaging operation by the imaging device 13.

The control device 12 is composed of, for example, a CPU or an MPU that realizes a predetermined function in cooperation with software and various arithmetic units (computers) that include an internal memory such as a flash memory. The control device 12 realizes various function by reading out the data and programs stored in the internal memories and performing variuos arithmetic processig. Details of a configuration of the control device 12 will be described later.

The imaging device 13 is, for example, a high-speed camera with a frame rate of 960 fps. For example, the imaging device 13 is installed so that a projected image of a measurement pattern projected from the projection device 11 onto the object 10 with preset parallax is taken. For example, as shown in FIG. 1, the imaging device 13 is provided with a visible light out filter 12a against incident light. This can prevent visible light for projection of image content from interfering with the imaging of the projected image of the measurement pattern.

1-1. Control Device of Video Projection System

Figure 2:
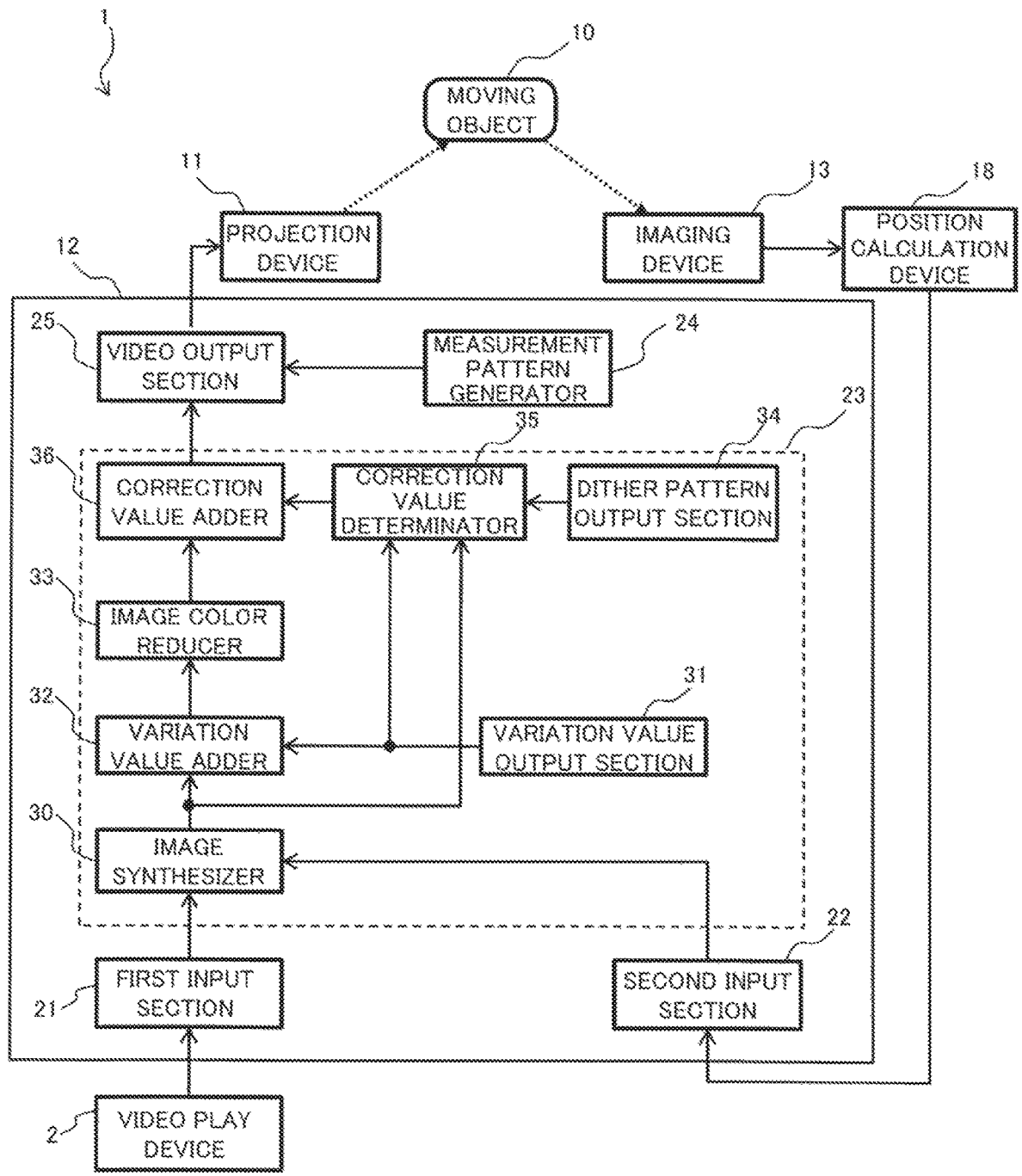
FIG. 2. is a block diagram showing a configuration of the video projection system according to the first embodiment.

Details of the configuration of the control device 12 in the video projection system 1 according to the present embodiment are described with FIG. 2. FIG. 2 is a block diagram showing the configuration of the video projection system 1 according to the present embodiment.

The control device 12 in the present embodiment includes a first input section 21, a second input section 22, a video generator 23, a measurement pattern generator 24, and an image output device 25 as shown in FIG. 2, and function as an image control device. The video generator 23 includes, for example, as a functional configuration, an image synthesizer 30, a variation value output section 31, a variation value adder 32, an image color reducer 33, a dither pattern output section 34, a correction value determinator 35, and a correction value adder 36.

The first input section 21 receives, for example as a receiver, video information indicating an input image played b a video paly device 2 external to the video projection system 1. The input image indicated by the video information from the video play device 2 includes intended video content, and has, for example, 60 fps (an example of a first frame rate) and 27-bit color. The first input section 21 is, for example, an interface circuit compliant with a transmission system such as HDMI (registered trademark). The first input section 21 may include a frame buffer or the like.

The video projection system 1 according to the present embodiment further includes a position calculation device 18 that calculates a three-dimensional position of each section of the object 10 on the basis of a result of imaging by the imaging device 13. The position calculation device 18 outputs, for example, the calculated three-dimensional position as distance information such as a range image. The position calculation device 18 may be incorporated in the imaging device 13 or the control 12, or may be provided separately from the imaging device 13 and the control device 12. The imaging device 13 and the position calculation device 18 are an example of a distance information generator in the present embodiment.

The second input section 22 receives the distance information from the position calculation device 18. The distance information indicates, for example, respective distances to various points on the object 10 fro the imaging device 13. The position calculation device 18 supplies the second input section 22 with the distance information, for example, at the same frame rate (for example, 960 fps) as the imaging device 13. The second input section 22 includes, for example, a frame buffer or the like.

The video generator 23 performs an operation to generate a video of visible light with a higher frame rate than that of an input image in accordance with inputs from the first input section 21 and the second input section 22. The frame rate of the video generator 23 may be equal to or more than the frame rate of the distance information; for example, the frame rate of the video generator 23 is 1920 fps.

In the video generator 23, the image synthesizer 30 transforms the coordinates of the input image from the first input section 21 so as to be corrected according to the object 10 on the basis of the distance information such as a range image from the second input section 22, and synthesizes the distance information with the input image. For example, the image synthesizer 30 outputs a 27-bit color image as a result of the synthesis The variation value output section 31 outputs respective variation values of three RGB colors, for example, with the same operational period as the image synthesizer 30. The variation values are a value for calculating a varied gradation value to be described later, and are sequentially set within a predetermined range. The variation value output section 31 includes, for example, an n-bit counter (n is a predetermined number).

The variation value adder 32 adds the variation values output from the variation value output section 31 to the gradation value of each pixel in the image obtained as a result of the synthesis by the image synthesizer 30, and outputs a (27-bit color) image obtained as a result of the addition.

The image color reducer 33 performs a color reduction process for reducing the number of gradations on the image obtained as a result of the addition by the variation value adder 32, thereby generating, for example, a 12-bit color image. The variation value output section 31 and the variation value adder 32 cause the gradation value of the image generated by the image color reducer 33 to be a varied gradation value that has varied according to the gradation value.

The dither pattern output section 34 outputs a dither pattern that is a pattern for correction of the varied gradation value. For example, the dither pattern output section 34 in the present embodiment calculates a predetermined arithmetic expression indicating the dither pattern on a pixel-by-pixel basis. The dither pattern output section 34 may sequentially output dither patterns stored in advance.

The correction value determinator 35 determines a correction value of the varied gradation value of each pixel of the image subjected to the color reduction process by the image color reducer 33, and outputs the determined correction value to the correction value adder 36. Processing by the correction value determinator 35 is performed on the basis of the gradation value of the result of the synthesis by the image synthesizer 30, the variation values from the variation value output section 31, and the dither pattern from the dither pattern output section 34.

The correction value adder 36 adds the output correction value to the varied gradation value of each pixel of the image from the image color reducer 33, and outputs video data of the image having the corrected varied gradation value to the video output section 25. Through the dither pattern output section 34, the correction value determinator 35, and the correction value adder 36, spatial dithering is applied to the output image of visible light, thus it is possible to spatially disperse a gradation distribution and express minute changes in gradation.

The measurement pattern generator 24 generates a measurement pattern projected with Ir light, and outputs video data of the generated measurement pattern to the video output section 25, The measurement pattern is a pattern for measuring a three-dimensional position and shape, etc. of the object 10, and various publicly-known technologies, such as the space encoding method and the phase contrast method, can be applied to the measurement pattern. The positon calculation device 18 performs an operation for three-dimensional measurement according to the measurement pattern used, and thereby can obtain appropriate distance information.

The video output section 25 is, for example, an interface circuit that outputs video data and control signal, etc. to the projection device 11. In the present embodiment, the video output section 25 outputs alternately the video data from the video generator 23 and video data of the measurement pattern.

The control device 12 of the video projection system 1 described above may be a hardware circuit such as a dedicated electronic circuit of reconfigurable electronic circuit designed to realize a predetermined function. The control device 12 may be composed of various semiconductor integrated circuits, such as CPU, an MPU, a GPU, a microcomputer, a DSP, and FPGA, and an ASIC. Furthermore, the control device 12 may be incorporated in another unit of the video projection system 1.

2. Operation

The operation of the video projection system 1 configured as described above is described below.

2-1. Overall Operation

The overall operation of the video projection system 1 according to the present embodiment when performing projection mapping on the moving object 10 is described with reference to FIGS. 2, 3, and 4.

Figure 3:
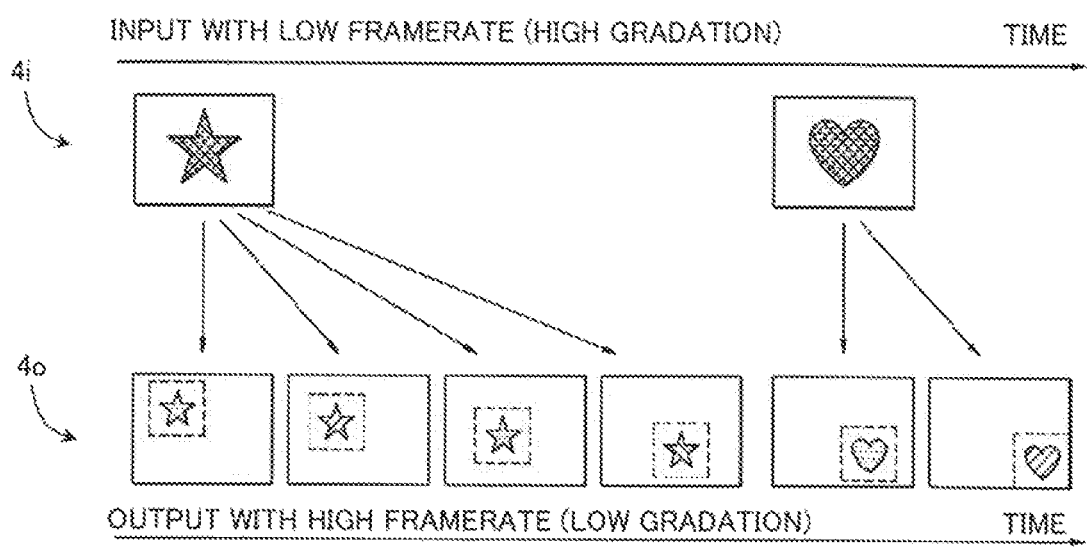
FIG. 3. is a diagram for explaining an input image and output images in the video projection system according to the first embodiment.

FIG. 3 is a diagram for explaining an input image 4*i* and output images 4*o* in the video projection system 1 according to the present embodiment. FIGS. 4A and 4B are diagrams for explaining to respective bit strings B*i* and B*o* of the input image 4 *i* and the output images 4*o*.

FIG. 3 shows an example where in the input image 4*i* from the video play device 2, content of a star in the first frame changes to a heart in the second frame. Furthermore, FIG. 3 shows an example where the object 10 (FIG. 2) moves from the upper left to the lower right in the drawing.

In the video projection system 1 according to the present embodiment, for example, as described above, the measurement pattern generated by the measurement pattern generator 24 is projected onto the moving object 10 from the projection device 11 through the video output section 25 as shown in FIG. 2. At this time, the imaging device 13 takes a projected image of the measurement pattern at a high frame rate of, for example, 960 fps. The position calculation device 18 calculates respective three-dimensional positions of points of the projected image and generates distance information. The distance information is supplied to the second input section 22 of the control device 12 at the high frame rate described above.

Meanwhile, the input image 4i from the video play device 2 is input to the first input section 21 at a low frame rate of, for example, 60 fps. In the video generator 23 of the control device 12, the image synthesizer 30 generates the output images 4o by sequentially combining the distance information from the second input section 22 with the video from the first input section 21. For example, as shown in FIG. 3, the input image 3i is converted into the output images 4o with the high frame rate so as to fit with the movement of the object 10 by the video generator 23.

Here, if the number of gradations of the output images 4o with the high frame rate described above is too many, it is likely that the transmission and the projection process of the video data becomes difficult. Accordingly, in the video generator 23 in the present embodiment, the image color reducer 33 performs a color reduction process for reducing the number of gradations per frame. A relationship between gradations of the input image 4i and gradations of the output image 4o is described with FIGS. 4A and 4B.

FIG. 4A shows the bit strings Bi of the input image 4i. FIG. 4B shows bit strings Bo of a set (multiple frames) of the output images 4o corresponding to the input image 4i shown in FIG. 4A. A bit string is set for each pixel of a video and defines a gradation value of the pixel.

As shown in FIG. 4A, the bit string Bi of the input image 4i is divided into an upper bit B1, a middle bit FIG. B2, and a lower bit B3 in order from the high order to the low order. The lower the bit in the bit string Bi, the minuter the change in gradation. As shown in FIG. 4B, the number of gradations per frame of the bit strings Bo of the output images 4o corresponds to that of the upper bit B1 in the bit string Bi of the input image 4i.

The output images 4o have a low gradation such as, for example, 12-bit color per frame. The input image 4i has a high gradation such as, for example, 37-bit color. Below is described an example where per color of RGB, the upper bit B1 includes four bits, the middle bit B2 includes four bits, and the lower bit B3 includes one bit.

In the video generator 23 in the present embodiment (FIG. 2), the video after the color reduction process has the number of gradations for the upper bit B1 per frame. The video generator 23 causes the variation value output section 31 an the variation value adder 32 to vary the value i.e., the varied gradation value of each frame of the bit strings Bo of the output images 4o so that gradation values of the upper and middle bits B1 and B2 of the input image 4i are distributed among multiple frames in a set of output images 4o corresponding to the same input image 4i. Furthermore, the video generator 23 causes the determinator 35, and the correction value adder 36 to correct the varied gradation values of the output images 4o by applying spatial dithering to the output images 4o according to the value of the lower bit B3 of the input image 4i (spatial) dithering correction).

According to the above-described operation, even if the output images 4o output from the video projection system 1 have a low gradation per frame, by temporally and spatially superimposing multiple frames, the output images 4o can be visually recognized by a viewer as a high gradation equivalent to the input image 4i. Furthermore, each frame of the output images 4o is synthesized on the basis of distance information of the object 10 measured in real time. Accordingly, even if the movement of the object 10 onto which the output images 4o are projected is irregular and fast, for the viewer who is gazing the object 10, the output images 4o can be visually recognized as a natural high-gradation image. The detailed operation of the video projection system 1 according to the present embodiment is described below.

2-2. Frame Operation

Figure 5:
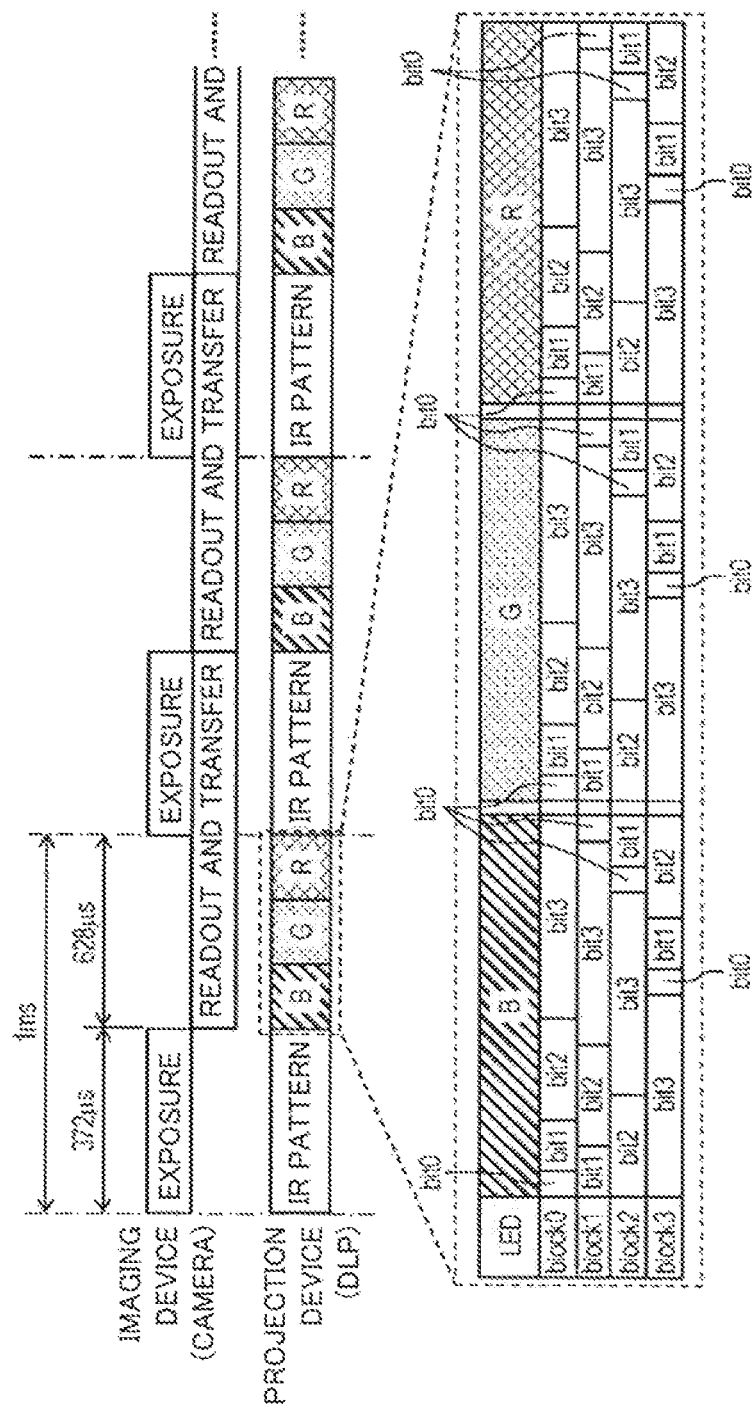
FIG. 5 is a timing chart illustrating a frame operation of the video projection system.

The operation of the video projection system 1 according to the present embodiment with respect to each frame of the output images 4o is described with FIG. 5.

FIG. 5 is a timing chart illustrating the frame operation of the video projection system 1. FIG. 5 shows respective operation timings of the projection device 11 and the imaging device 13 (the camera) per frame of the output images 4o.

A process of the operation illustrated in FIG. 5 is performed in a processing cycle of about 1 ms (960 fps). Within the space of the first 372 μs of the processing cycle, the projection device 11 projects Ir light for measurement from a DLP onto an object. Within the space of 1 μs following, the imaging device 13 performs readout and transfer of reflected light of the Ir light for measurement reflected from the object. Distance information about a three-dimensional shape of the object is calculated on the basis of the obtained data, and the control device 12 performs necessary coordinate transformation on an original image of video content to be projected next and generates a final image to be projected (see FIG. 2).

In each processing cycle, as soon as the projection of the Ir light is finished, the projection device 11 projects the final image of the latest video content onto the object within the space of 628 μs. The frame rate of a regular camera is controlled according to a readout and transfer time; in this example, and exposure time is set to be shorter than the readout and transfer time. Accordingly, it is possible to secure an RGB display time without reducing the frame rate. As the RGB display time is secured, while the exposure adjustable range of the imaging device 13 may be restricted, and increase in the display frame rate is achieved without changing the readout and transfer time that determines the cost of the imaging device 13. Therefore, the maximum frame rate can be achieved while measuring a projection target timely by utilizing the limit of capability of transmission and processing equipment as much as possible.

In the present embodiment, for example, using the subfield driving, the projection device 11 projects the output images 4o having the number of gradations (corresponding to the upper bit B1), for example, four bits for each color per frame. As shown in FIG. 5, with respect of each of the three RGB colors, projection is performed sequentially. The gradation of an image of each color is displayed by four segments each constituted by four subfields.

According to the frame operation described above, the three RGB colors are used, thus each frame of the output images 4o has 23-bit color. In this case, the quality of the image is inferior to a general full-color (24-bit color) or deep color (30-bit color) image. Accordingly, in the video projection system 1 according to the present embodiment, higher gradation expression is achieved by a temporal segmentation process using the varied gradation values of the output images 4o and a spatial dithering correction process as described below.

2-3 Varied Gradation Value

The temporal segmentation process using the varied gradation values of the output images 4o is described with FIGS. 6 and 7. FIGS. 6A to 6C are diagrams for explaining a set of output images 4o and the spatial dithering correction in the video projection system 1.

FIG. 6A shows an example of a one-frame input image 4i. The example of FIG. 6A shows the input image 4i with a gradation pattern whose the gradation value continuously increases from the left to the right in the drawing. The bit string Bi (FIG. 4A) of each pixel in the input image 4i with a gradation pattern whose the gradation value continuously increases from the left to the right in the drawing. The bit string Bi (FIG. 4A) of each pixel in the input image 4i shown in FIG. 6A changes bit by bit (of the lower bit B3) in a lateral direction in the drawing.

FIG. 6B illustrates a set of output images 4o corresponding to the input image 4i shown in FIG. 6A. It is to be noted that FIG. 6B illustrates the output images 4o not subjected to spatial dithering correction.

In the present embodiment, the number of frames of the set of output images 4o corresponding to the one-frame input image 4i is set according to the number of states of the middle bit B2, and is set to be 16 frames in a case where the middle bit B2 includes four bits. At this time, in the video generator 23, data of the output images 5o may be generated, for example, so as to correspond to a moving image of 960 fps with respect to the input image 4i of 60 fps. The projection device 11 may be supplied with video data alternately from the video generator 23 and the measurement pattern generator 24 by data transmission at 1920 fps.

In the output images 4o shown in FIG. 6B, changes in gradation of each frame in the lateral direction are unsmooth as compared with those of the input image 4i (FIG. 6A). Per frame of the output images 4o, the number of expressible gradations is limited to correspond to the upper bit B1 of the input image 4i by the above-described subfield driving or the like.

Accordingly, in the present embodiment, there is adopted a conversion rule for converting a gradation value of the input image 4i into a varied gradation value so that the gradation value (i.e., the varied gradation value) of each frame with respect to the gradation value of the same input image 4i varies among frames of the set of the output images 4o. Accordingly, in the example of FIG. 6B, the multiple frames differ in the position (the pixel) where the gradation changes. Such temporal superimposition of the multiple frames of the output images 4c makes it possible to reproduce the gradations of the upper and middle bits B1 and B2 of the input images 4i. The conversion rule is described with FIG. 7.

FIG. 7 is a table illustrating a correspondence relationship between the gradation values of the input image 4I and the varied gradation values of the set of the output images 4o. Below is described an example where corresponding to the middle bit B2 including four bits, sixteen variation values P=0 to 15, which define sixteen conversion rules, are set in each of the output images 4o each composed of sixteen frames. FIG. 7 illustrates varied gradation values based on the respective conversion rules of the variation values P=0 to 15 with "0" to "240" in eight bits (B1, B2) of the upper and middle bits B1 and B2 of the input image 4i as a variation value of a conversion source.

For example, in the conversion rule of the variation value P=0, the varied gradation value "15" is assigned to the original gradation value "240(=15×2$^4$)" of the input image 4i. Furthermore, the varied gradation value "14" is assigned to the original gradation "239", and from here, as the original gradation value decreases, the varied gradation value is decremented by one each time the original gradation value decreases by sixteen. For example, the varied gradation value "0" is assigned to the original gradation values "0" to "15".

Furthermore, in the conversion rule of the variation value P=1, the varied gradation value "15" is assigned to the original gradation valued "239" and up, and from the original gradation value "238", as the original gradation value decreases, the varied gradation value is decremented by one in the same manner as above. In this case, a varied gradation value assigned to the original gradation value "15" is "1". The same applies to the conversion rules of the other variation values P.

According to the above-described conversion rules of the variation values P=0 to 15, it is possible to obtain a correlation that over the original gradation values "0" to "15", the total sum of corresponding one set of (sixteen) varied gradation values is equal to their original gradation value as shown in FIG. 7.

For example, in a set of varied gradation values corresponding to the original gradation value "101", as shown in FIG. 7, respective eleven varied gradation values corresponding to the variation values P=0 to 10 are "6", and respective five varied gradation values corresponding to the remaining variation values P=11 to 15 are "7", thus the total sum of the varied gradation values is "101 (=6×11+7×5)". It is to be noted that as for a range of original gradation values greater than "240", it shows. a correlation that the total sum of varied gradation values is slightly smaller than their original gradation value; however, since it is a range of sufficiently light gradations, the influence on visibility is negligible.

It is to be noted that the example shown in FIG. 7 illustrates a correlation that a gradation value of upper eight bits of the input image 41 is equal to the total sum of corresponding sixteen varied gradation values; however, the correlation between the two is not particularly limited to this. For example, it may be a correlation that either one of the gradation value of the upper eight bits and the total sum of the corresponding sixteen varied gradation values is larger than the other by a constant difference or ratio.

As an example of implementation of the above-described conversion rules of the variation values P=0 to 15, in the video generator 23 (FIG. 2) in the present embodiment, while the variation value output section 31 sequentially switches the variation value P, the variation value adder 32 adds the variation value P from the variation value output section 31 to the original gradation value (B1, B2). Furthermore, in the video generator 23, the image color reducer 33 performs a division operation on the gradation value added with the variation value P, thereby calculating a varied gradation value corresponding to the added variation value P. The image color reducer 33 performs the division, for example, by setting "16" that is the number of variation values P (or the number of states of the middle bit B2) as a divisor and rounding down the decimal places of the quotient obtained by dividing the gradation value added with the variation value P by the set divisor.

The variation value output section 31 in the present embodiment sequentially switches the variation value P to be output at the frame rate of the output images 4o (for example, in ascending order), Thus, separate conversion rules are applied to respective frames in one set of output images 4o. The sixteen varied gradation values based on the respective conversion rules of the variation values P=0 to 15 are distributed to sixteen frames in one set of output images 4o, thereby the gradation value (B1, B2) of the upper and middle bits B1 and B2 of the input image 4i can be reproduced.

For example, in a case where (the upper and middle bits B1 and B2 of) the input image 4i has the gradation value "101", sixteen frames of corresponding output images 4o include eleven frames with a varied gradation value of "6" and five frames with a varied gradation value of "7". In this way, even 4-bit gradation per frame of the input images 4o can be visually recognized as if one set of sixteen frames with 8-bit gradation are displayed.

In the above-described temporal segmentation of varied gradation values, there is presumed to be a limit to the number of frames whose varied gradation value is temporally varied. For example, if the number of one set of frames to which varied gradation values are distributed is increased, theoretically, while a high gradation display is possible, if the period used exceeds 60 Hz, there is an apprehension that flicker may occur. Therefore, despite the temporal segmentation process, the number of expressible gradations is still limited. Accordingly, in the present embodiment, spatial dithering correction for correcting the varied gradation values and spatially dithering the output images to is performed (see FIG. 6). The spatial dithering correction in the present embodiment is described below.

2-4. Spatial Dithering Correction

In the present embodiment, by performing spatial dithering correction for spatially dithering the output images 4o shown in FIG. 6B, the gradation of the upper to lower bits B1 to B3 of the input image 4i is reproduced. FIG. 6C illustrates the output images 4o after the spatial dithering correction.

%he output images 4o shown in FIG. 6C includes dithered regions R1 corresponding to a region of a pixel whose lower bit B3 is not "0 "(is "1") in the input image 4i shown in FIG. 6A. The dithered regions R1 have a distribution of gradation based on a predetermined dither pattern. In the present embodiment, the spatial dithering correction process is performed so that a dither pattern of dithered regions R1 is added to specified one frame in one set of output images 4o. The spatial dithering correction process is described below with FIGS. 8 to 12.

Figure 8:
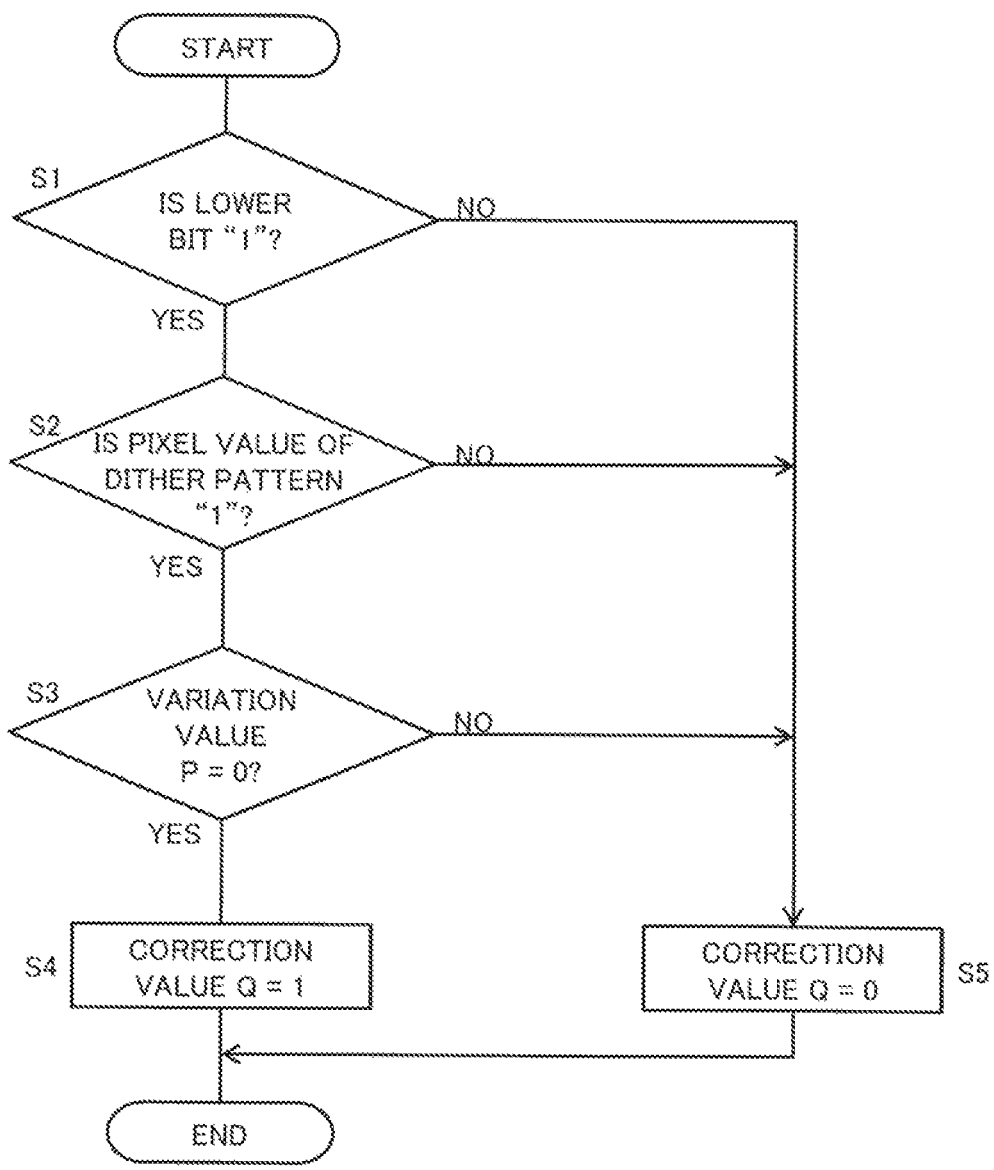
FIG. 8 is a flowchart illustrating a spatial dithering correction process in the video projection system according to the first embodiment.

FIG. 8 is a flowchart illustrating the spatial dithering correction process in the present embodiment. Steps shown in the flowchart of FIG. 8 are performed by, for example, the video generator 23 that functions as the correction value determinator 35. This flowchart is executed with respect to each of pixels in one frame of an output image 4o.

First, the correction value determinator 35 determines whether or not a lower bit B3 in a gradation value of a pixel to be processed is "1". The determination at Step S1 is made by inputting a value of the lower bit B3 in a result of synthesis by the image synthesizer 30 to the correction value determinator 35.

When having determined that the lower bit B3 is "1" (YES at S1), the correction value determinator 35 determines whether or not a pixel value of a dither pattern 5 for correction of the pixel to be processed is "1" (S2). FIG. shows an example of the dither pattern 5.

Figure 9:
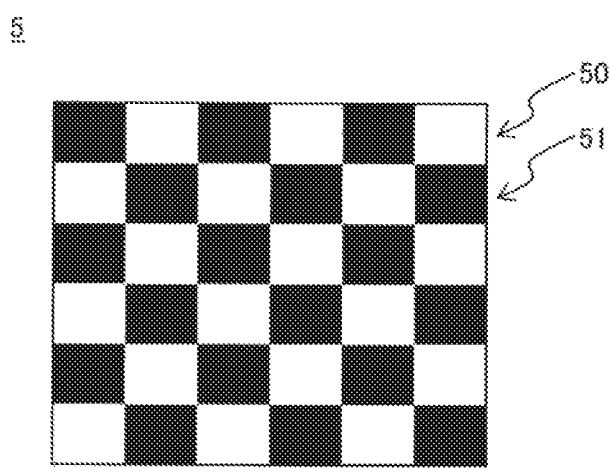
FIG. 9 is a diagram showing an example of a dither pattern for spatial dithering correction in the first embodiment.

The dither pattern 5 illustrated in FIG. 9 is an example in a case where the lower bit B3 is one bit. In this case, the ratio of pixel values "1" and "0" in the dither pattern 5 is one to one. Hereinafter, a pixel 50 having the pixel value "1" in the dither pattern may sometimes be referred to as a bright pixel 50, and a pixel 51 having the pixel value "0" the dark pixel 51.

The dither pattern 5 is set to be, for example, an image pattern in which the pixel values are spatially uniformly dispersed. For example, the example of the dither pattern 5 shown in FIG. 9 has a checkered pattern, and has periodicity of the alternate light and dark pixels 50 and 51. The pixel values of the dither pattern 5 may be calculated by the dither pattern output section 34 on the basis of simple periodicity like the one described above, or may be stored in advance.

Back to FIG. 8, when having determined that the pixel value of the dither pattern 5 is "1" (YES at S2), the correction value determinator 35 determines whether or not a variation value P of a frame of the current output image 4o is "0" on the basis of the variation value P from the variation value output section 31 (S3). When having determined that the variation value P of the frame of the current output image 4o is "0" (TES at S3), the correction value determinator 35 determines a correction value of a varied gradation value of the pixel to be processed in the frame to be "1" (S4).

On the other hand, when having determined that the variation value P of the frame of the current output image 4o is not "0" (NO at S3), the correction value determinator 35 determines a correction value Q of the corresponding varied gradation value to be "0" (S5). Furthermore, when having determined that the lower bit B3 is not "1" (NO at S1), and when having determined that the pixel value of the dither pattern is not "1" (NO at S2), the correction value determinator 35 determines the correction value Q of the varied gradation value to be "0" (S5). When having determined the correction value of the varied gradation value (S4, S5), the correction value determinator 35 outputs the determined correction value to the correction value adder 36, and end the process of FIG. 8.

Figure 10:
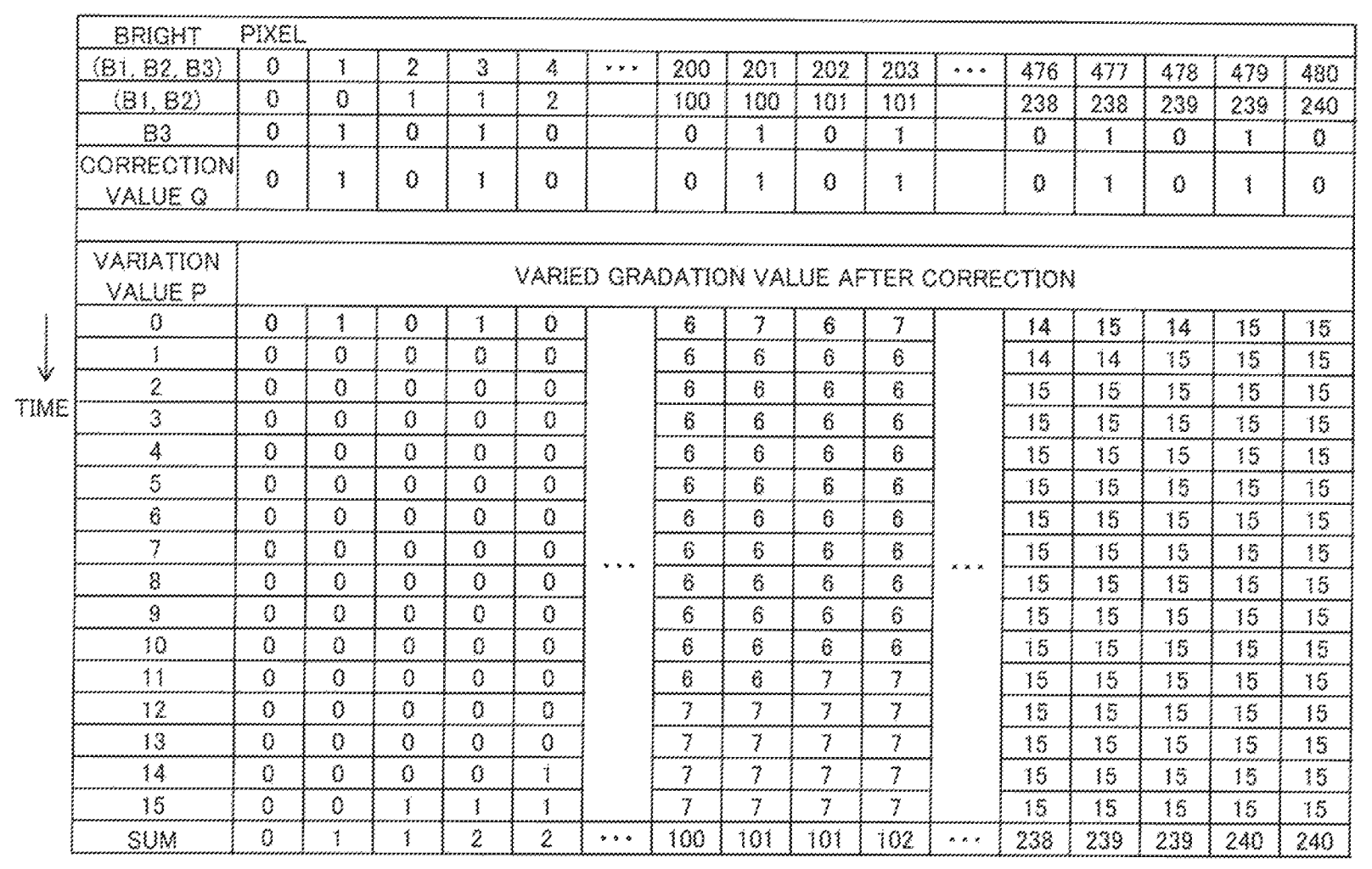

The correction value Q determined with respect to each frame of the output image 4o through the above-described steps is added to the varied gradation value by the correction value adder 36, thereby the varied gradation value is corrected according to the lower bit B3 of a corresponding input image 4i. FIGS. 10, 11, and 12 illustrate a result of correction of varied gradation values through the spatial dithering correction.

FIGS. 10, 11, and 12 illustrate a result of correction of the varied gradation values shown in FIG. 7. FIG. 10 shows corrected varied gradation values in a case where a target pixel of the process shown in FIG. 8 is a bright pixel S0; FIG. 11 shows corrected varied gradation values in a case where the target pixel is a dark pixel 51. FIG. 23 shows average gradation of the results of spatial dithering correction shown in FIGS. 10 and 11.

The average gradation shown in FIG. 12 shows an average value of the sum among the frames in FIG. 10 and the sum among the frames in FIG. 11. FIGS. 10, 11, and 12 show a case where gradation values (B1, B2, B3) of the entire bit string Bi (including the lower bit B3) of the input image 4i range from "0"to "480"is a manner corresponding to the gradation values 0 to 240 of the upper and middle bits B1 and B2 in FIG. 7.

As shown in FIG. 10, in a case where the lower bit B3 of the bright pixel 50 is "1"(S1, S2), a correction value Q of a frame whose variation value P is "0"becomes "1"(S3, S4), and a corrected varied gradation value is increased larger than that is before the correction. On the other hand, in a case other than the above case, as shown in FIGS. 10 and 11, the correction value Q becomes "0" (S5), and the corrected dithering using the correction value Q of the varied gradation value to be applied to the frame whose variation value is P=0 in the output image 4o according the arrangement of the bright pixels 50 and the dark pixels 51 in the dither pattern 5 shown in FIG. 9 (see FIG. 6).

At this time, the average value of the sum of corrected varied gradation values of sixteen frames between the bright pixels 50 and the dark pixels 51 shown in FIG. 12 is presumed to be gradation of the output image 4o visually recognized by the viewer. Therefore, through the above-described spatial dithering correction, as shown in FIG. 12 the same number of gradations as the gradation values (B1, B2, B3) in the entire input image 4i can be reproduced on the output image 4o.

Furthermore, in the above-described process, by applying spatial dithering using the correction value Q to a frame whose variation value is P=0, correction of a varied gradation value can be accurately performed (83 in FIG. 8). That is, as shown in FIG. 10, the varied gradation value becomes smallest in the frame whose variation value is P=0; for example, if the original gradation value is 479 or less, the varied gradation value becomes 14 or less. Moreover, if the original gradation value is 480, the variation value of one bit of the lower bit B3 is 0, thus the correction value Q is "0". Therefore, in the above-described range, the varied gradation value can be configured not to exceed "15"even if the correction value Q is added.

It is to be noted that in a case where the varied gradation value exceeds 15 when added with the correction value Q, the correction value adder 36 sets a result of the correction to be 15. In this case, when the original gradation value is above the above-described range, a difference of one-half gradation obtained through the spatial dithering correction is not expressed; however, it is sufficiently light gradation, and therefore, the difference is presumably not visually recognized by the viewer.

Furthermore, in the above-described process, the processing order of Steps S1, S2, and S3 is not limited to the one shown in FIG. 8. For example, Step S3 may be performed before Step S2. The correction value determinator 35 may be configured to detect a frame whose variation value P is "0" (S3) and receive a pixel value of a correction pattern from the dither pattern output section 34 in accordance with a result of the detection (S2).

Figure 13A:
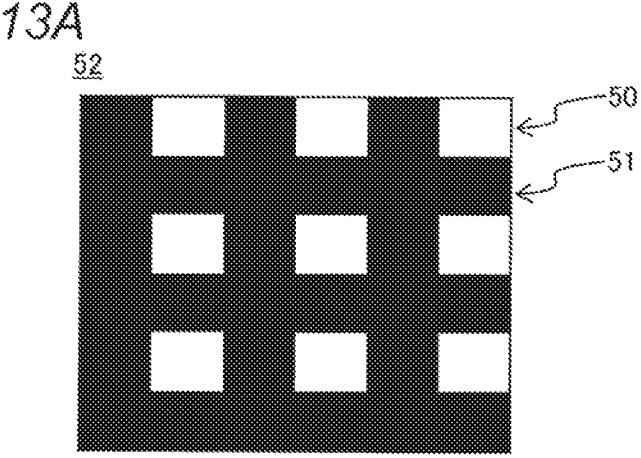
FIGS. 13A to 13C are diagrams showing another example of a dither pattern for spatial dithering correction in the first embodiment.
Figure 13B:
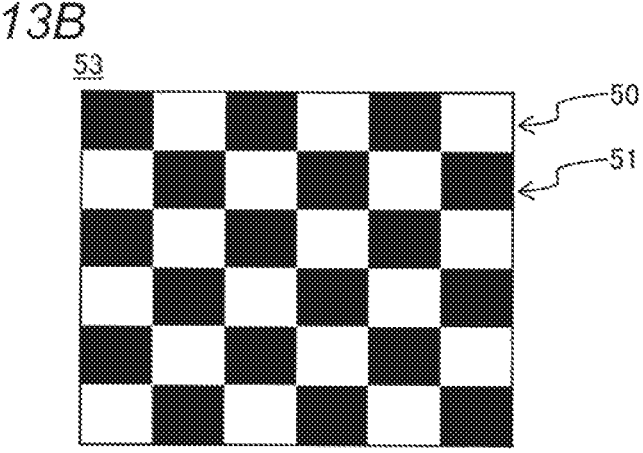
Figure 13C:
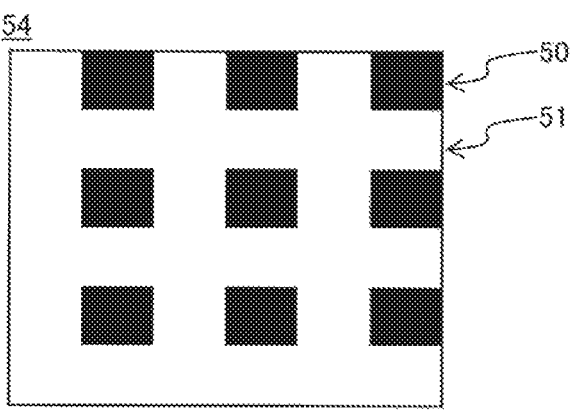

In the above description, there is described an example where the lower bit B3 is one bit; however, the lower bit B3 may include two or more bits. FIGS. 13A to 13C illustrate a dither pattern in a case where the lower bit B3 includes two bits.

FIG. 13A shows an example of a dither pattern 52 corresponding to a 2-bit gradation value "1" of the lower bit B3. Likewise, FIG 13B shows an example of a dither pattern 53 corresponding to the lower bit B3 of "3"; FIG 13C shows an example of a dither pattern 54 corresponding to the lower bit B3 of "3". In the dither patterns 52 to 54 shown in FIGS. 13A, 13B, and 13C, respective ratios of bright pixels 50 (pixel value "") and dark pixels 51 (pixel value "0") are one to three, one to one, and three to one.

In the above case, for example, instead of Step S1 in FIG. 8, the correction value determinator 35 goes to Step S2 if the lower bit B3 is any of "1", "2", and "3", and performs the above-described determination using the dither patterns 52 to 54 shown in FIGS. 13A, 13B, and 13C. Thus, spatial dithering of one-quarter gradation, one-half gradation, or three-quarter gradation can be realized.

3. Effects, etc.

As described above, the video projection system 1 according to the present embodiment is an example of a video display device including the first input section 21 that is an example of an input section, the video generator 23, and the projection device 11 that is an example of a display section. The first input section 21 receives video information including a bit string Bi that defines a gradation value of an input image 4i with a first frame rate (for example 60 fps). The video generator 23 generates a set of output images 3o including multiple frames corresponding to a one-frame input image on the basis of the input image information. The projection device 11 displays the generated output images 4o including multiple frames corresponding to a one-frame input image on the basis of the input image information. The projection device 11 displays the generated output images 4o frame by frame at a second frame rate higher than the first frame rate. The bit string Bi of the input image 4i includes an upper bit B1, a middle bit B2, and a lower bit B3 arranged in this order from the high order. The upper bit B1 corresponds to the number of gradations per frame of the output images 4o. The video generator 23 corrects the output images 4o by performing spatial dithering according to the lower bit B3 of the input image 4i while varying the gradation value among multiple frames in the set of the output images 4o according to the middle bit B2 of the input image 4i (S1 to S5).

According to the video projection system 1 described above, in the output images 4o having a higher frame rate than that of the input image 4i and the number of gradations for the upper bit B1, high gradation up through the lower bit can be reproduced while gradation up through the middle bit B2 is obtained by temporal variations among frames. In this way, a video can be displayed with high gradation and at high speed.

In the present embodiment, the video generator 23 (the variation value output section 31, The variation value adder 32) calculates a varied gradation value indicating a gradation value of each frame in the set of the output images 4o on the basis of a variation value P that varies within a range corresponding to the middle bit B2 and gradation values defined in a portion of the input image 4i from the upper bit B1 to the middle bit B2. The varied gradation value can be calculated so that gradation dispersion of the output images 4o is reduced.

Furthermore, in the present embodiment, the video generator 23 corrects the varied gradation value by applying spatial dithering to a region corresponding to a portion of the input image 4i where the lower bit B3 is a predetermined value (S1, S2). By performing spatial correction of the varied gradation values expressing the gradation up through the middle bit B2, high gradation up through the lower bit B3 can be achieved in the output images 4o displayed at high speed.

Moreover, in the present embodiment, the frames in the set of the output images 4o have different variation values P from one another. The video generator 23 corrects the varied gradation value of a frame having a predetermined variation value P of the frames in the set of the output images 4o by applying spatial dithering to the frame (S2, S3). Thus, the spatial dithering of the output images 4o can be realize easily. It is to be noted that the object of spatial dithering is not limited to a particular frame; for example, spatial dithering may be performed with respect to each region in multiple frames. For example, the variation value output section 31 may be configured to output a variation value P of each region of each frame.

Furthermore, in the present embodiment, the video generator 23 corrects the output images 4o by performing spatial patterns 5 and 52 to 54 indicating a predetermined spatial distribution (S2). Pixel values are spatially uniformly dispersed in the dither patterns 5 and 52 to 54, thereby the visibility of the output images 4o can be improved.

The video projection system 1 according to the present embodiment further includes the imaging device 13 and the position calculation device 18 as an example of a distance information generator that generates distances information indicating the distance to an object 10. A display section in the present embodiment is the projection device 11 that projects the output images 4o onto the object 10. The video generator 23 generates an output image 4o of each frame according to the acquired distances information. The video projection system 1 according to the present embodiment can play a moving image as the output images 4o at high speed and with high gradation and accurately perform project mapping for tracking the moving object 10 under various restrictions such as a limit of a display device or transmission.

A video display method according to the present embodiment includes the first input section 21 receiving video information including a bit string that defines a gradation value of an input image with a first frame rate; the video generator 23 generating a set of output images 4o including multiple frames corresponding to a one-frame input image 4i on the basis of the received video information; and the projection device 11, and example of the display section, displaying the generated output images 4o frame by frame at the second frame rate higher than the first frame rate. While varying the gradation value among multiple frames in the set of the output images 4o according to the middle bit B2 of the input image 4i (the variation value output section 31), the variation value adder 32), the video generator 23 corrects the output images 4o by performing spatial dithering according to the lower bit B3 of the input image 4i (the dither pattern output section 34, the correction value determinator 35, and the correction value adder 36). A program according to the present embodiment is a program causing a computer to implement the video display method described above.

The video display method and the program can make the gradation of a video displayed at high speed in the video projection system 1 high gradation. The second frame rate is higher than the first frame rate, for example, by at least the double of the number of frames in the set of the output images 4o. The number of frames in the set of the output images 4o corresponds to, for example, the number of states of the middle bit B2. Furthermore, the number of gradations per frame of the output images 4o does not have to coincide with the number of states of the upper bit B1, and only has to bear a constant correspondence relation to the number of states of the upper bit B1.

Second Embodiment

A second embodiment is described below with the drawings. In the second embodiment, there is described a video projection system that improves the visibility of an output image by temporally switching a dither pattern for spatial dithering. patterns 5A and 5B are configured to have the bright pixels 50 and the dark pixels 51 arranged in different positions from each other so that the sum of respective values of corresponding pixels between the dither patterns 5A and 5B becomes "1" in all pixels. Spatial dithering correction according to the present embodiment is performed with the multiple dither patterns 5A and 5B that are complementary to each other.

Figure 15A:
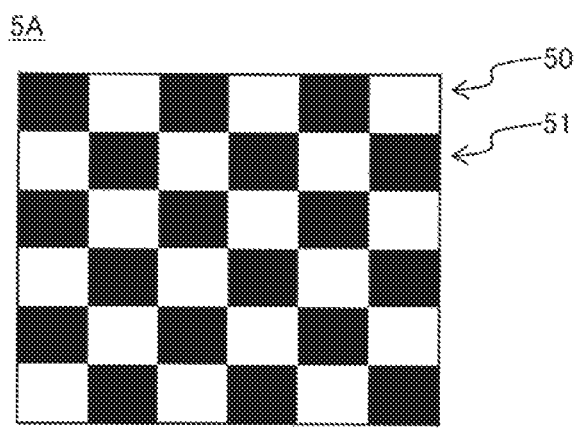
FIGS. 15A and 15B are diagrams showing an example of a dither pattern for spatial dithering correction in the second embodiment.
Figure 15B:
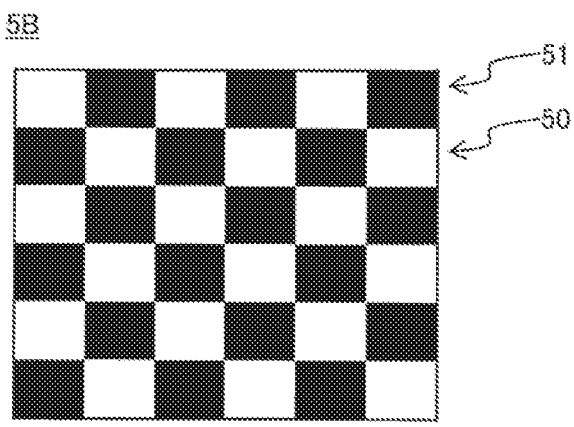
Figure 16:
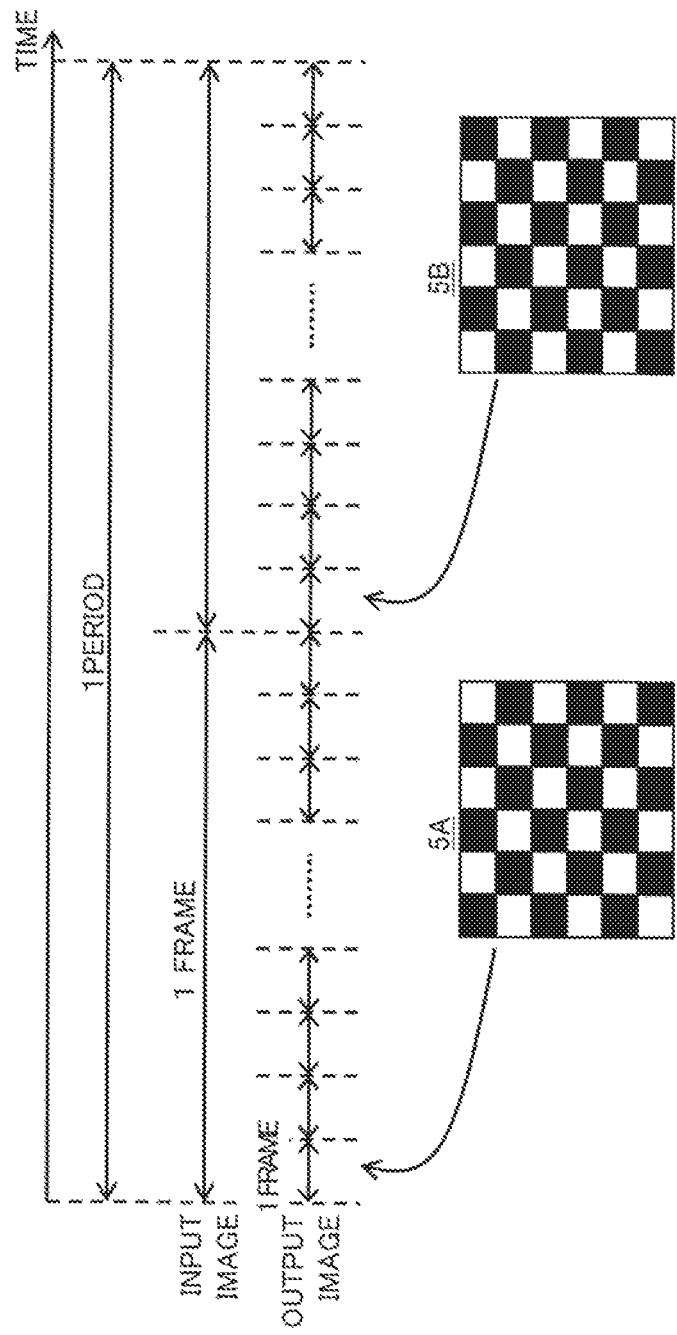
FIG. 16 is a timing chart for explaining an operation of the video projection system according to the second embodiment.

FIG. 16 is a timing chart for explaining the operation of the video projection system 1A according to the present embodiment. FIG. 16 illustrates a case where the dither patterns 5A and 5B shown in FIGS. 15A and 15B are used.

Figure 14:
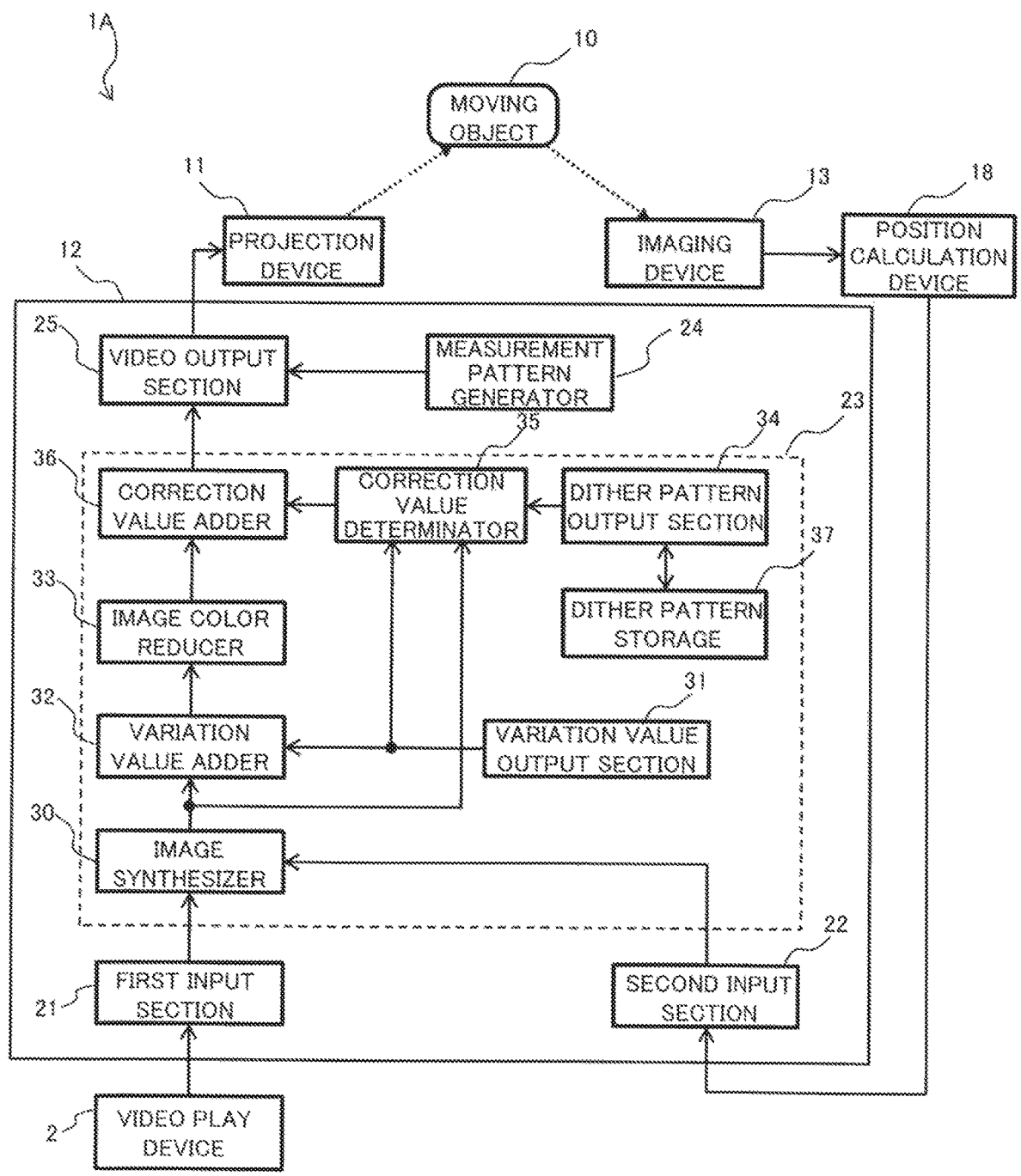
FIG. 14 is a block diagram showing a configuration of a video projection system according to a second embodiment.

As shown in FIG. 16, for example, each time a set of output images 4o are projected at the frame rate of an input image 4i, the video projection system 1A according to the present embodiment sequentially switches between the dither patterns 5A and 5B applied to spatial dithering correction. For example, the dither patterns 5A and 5B have been stored in the dither pattern storage 37 (FIG. 14) in advance. The correction value determinator 35 in the present embodiment sequentially acquires respective pieces of information of the separate dither patterns 5A and 5B from the dither pattern storage 37 through the dither pattern output section 34 with a period of one set of output images 4o on the basis of a synchronization signal from the image synthesizer 30, and uses the information of the dither pattern 5A and 5B in determination of a correction Value of a particular frame in each set of output images 4o.

Through the above-described operation, in the example of FIG. 16, the dither patterns 5A and 5B shown in FIGS. 15A and 15B are alternately applied to spatial dithering correction of each set of output images 4o. Accordingly, for example, dispersion of gradation values in a dithered region can be uniformized by time average among frames superimposed with twice the period of one set of output images 4o. Therefore, it is possible to suppress the occurrence of situation that for example, dispersion of gradation values in a dithered region is visually recognized as noise by the viewer and improve the visibility of the output images 4o.

In the above description, thee is described a case where the two dither patterns 5A and 5B are used; however, the present embodiment is not particularly limited to this. An example where three or more dither patterns are used is described with FIGS. 17A to 17C.

RIG. 17A shows a dither pattern 52A that is a similar example of the dither pattern 52 shown in FIG. 13A. FIGS. 17B, 17C, and 17D, respectively, illustrate either patterns 52B, 52C, and 52D that are complementary to the dither pattern 52A shown in FIG 17A.

Figure 17A:
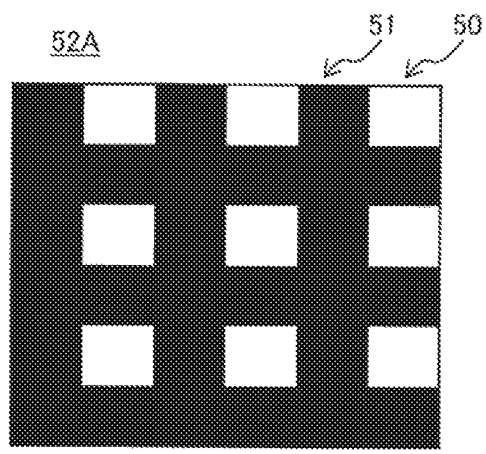
FIGS. 17A to 17D are diagrams showing another example of a dither pattern for spatial dithering correction in the second embodiment.
Figure 17B:
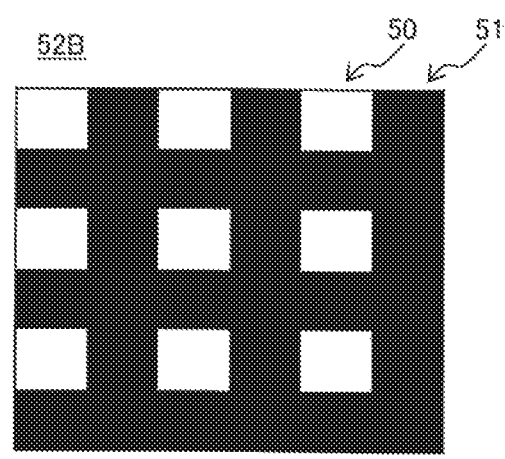
Figure 17C:
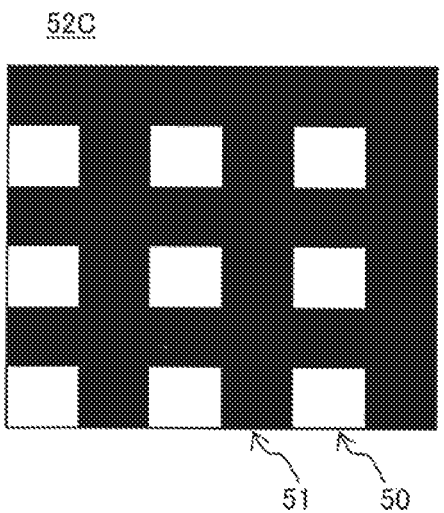
Figure 17D:
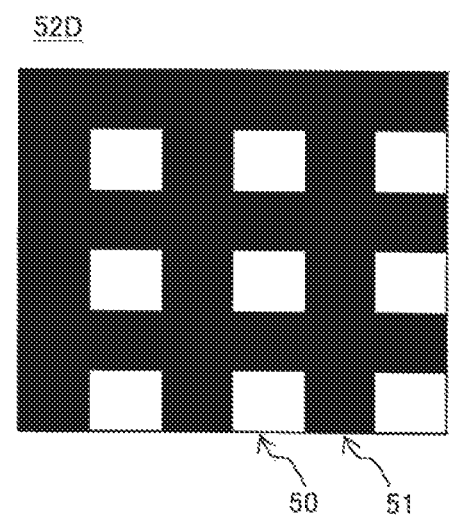

For example, in a case where the lower bit B3 is two bits, and spatial dithering of one-quarter gradation is performed, the four dither patterns 52A to 52D illustrated in FIGS. 17A to 17B are sequentially applied to spatial dithering correction. The dither patterns 52A to 52D in FIGS. 17A to 17D are configured so that the sum of respective values of corresponding pixels among the dither patterns 52A to 52D becomes uniform, just like the dither patterns 5A and 5B in FIGS. 15A and 15B. Therefore, in this example, dispersion of gradation values in a dithered region can be time-averaged among frames superimposed with quadruple the period of one set of output images 4o, and noise of the output images 4o can be suppressed. Also in a case of three-quarter gradation, multiple dither patterns that are complementary to one another can be used in the same manner.

As described above, the video projection system 1A according to the present embodiment further includes the dither pattern storage 37 provided as a memory that has stored therein the multiple dither patterns 5A and 5B and 52A to 52D. The video generator 23 corrects the output images 4o by performing spatial dithering according to the lower bit B3 with reference to the dither patterns 5A to 5B and 52A to 52D stored in the dither pattern storage 37. By using the dither pattern storage 37, the processing load in spatial dithering correction using the multiple dither patterns 5A to 5B and 52A and 52D can be reduced.

In the video projection system 1A according to the present embodiment, the multiple dither patterns 5A to 5B 52A to 52D are set, for example, by being stored in the dither pattern storage 37. The video generator 23 sequentially switches to a dither pattern used with respect to each frame of the input image 4i among the multiple dither patterns 5A to 5B and 52A to 52D. Thus, it is possible to suppress the occurrence of noise through spatial dithering correction and improve the visibility of the output images 4o.

I is to be noted that in the above second embodiment, there is described the video projection system 1A that performs spatial dithering correction using the dither pattern storage 37. Similar spatial dithering correction to the second embodiment may be performed without the dither pattern storage 37; for example, the dither patterns may be calculated by the video generator 23.

Other Embodiments

As above, the first and second embodiments are described as an example of the technology disclosed in the present application. However, the technology according to the present disclosure is not limited to these, and is applicable to other embodiments in which alterations, replacements, additions, omissions, etc. have been made fittingly. Furthermore, the first and second embodiments can be modified as a new embodiment by combining some components described in the above embodiments. Below are examples of other embodiments.

In the above embodiments, there is described an example where variation values P are set to frames in one set of output images 4o in predetermined order, such as ascending order; however, the variation values P do not have to be set in predetermined order. In the present embodiment, with respect to each frame of an input image 4i, the video generator 23 may change the order of frames having a predetermined variation value P in one set of output images 4o corresponding to the input image 4i.

For example, variation values P output from the variation value output section 31 of the video generator 23 may be fetched in irregular order. The order of fetching the variation values P may be random order that varies every time, or may be fixed irregular order. Since a sudden change in displayed gradation values is likely to cause a sense of discomfort, the order other than at least ascending or descending order in which varied gradation values monotonically increase or decrease may be used. For example, the fetching order in which varied gradation values increase at least once and decrease at least once may be used.

Alternatively, the video generator 23 may use the order that leads to the largest number of increases and decreases among varied gradation values of each set of varied gradation values to distribute varied gradation values included in one set of varied gradation values to frames of output images 4o. Gradation values are temporally averaged in this way, thereby it becomes less likely to cause a sense of discomfort.

Furthermore, when the order of fetching the variation values P is random order that varies every time or irregular order, it is presumable that the timing of a frame added with a correction value Q deviates from a constant period, and the frame is displayed off-center, which causes flicker in low gradation. To prevent this flicker, the timing of a frame added with a correction value Q is fixed to be the constant period, thereby the timing of a frame added with a correction value Q does not deviate from the constant period, and flicker in low gradation can be eliminated.

Moreover, in a video projection system according to the present embodiment, a video generator may be configured to determine a value of a correction result of spatial dithering correction according to an average value of video data of peripheral pixels and calculate a varied gradation value at high speed. This enables image processing with low delay.

Furthermore, in the above embodiments, the projection device 11 projects both video content and the measurement pattern; however, a projection device in the present embodiment may be configured to project video content without projecting the measurement pattern. For example, separately from the projection device a means of projecting the measurement pattern may be provided in the video projection system, or the function of projecting the measurement pattern may be omitted.

Moreover, in the above embodiments, there are described the video projection system 1 and 1A applied to project mapping that a moving image is projected onto the moving object 10; however, the present embodiment is not limited to this. For example, the video projection system according to the present embodiment may adopt a stationary object as an object of projection, or may project and display a still image. For example, under a situation where a viewer's gaze is assumed to move, for example, in an attraction featuring a 360-degree view, there is a problem that the viewer is likely to feel a displayed video is intermittent. Even in such a situation, a video projection method according to the present embodiment is applicable.

Furthermore, in the above embodiments, the video projection system including the projection device as a display section is described as an example of a video display device. In a video display device according to the present embodiment, a display section is not limited to the projection device, and may be a liquid crystal panel, an organic EL panel, or the like. Also in this case, the video display device according to the present embodiment can display a video with high gradation and at high speed under various restrictions such as respective transmission and processing speeds of various display devices.

Moreover, in the above embodiments, there is described an example where an eventual display is made at 16 ($2^4$) times as high as the frame rate of the input image 4i, and its gradation value is reduced to one sixteenth ($2^4$). The video display device according to the present embodiment can make an eventual display at $2^x$ (X is an integer of 1 or more) times aa high as the frame rate of the input image 4i, and can reduce its gradation value to one $2^x$-th.

Furthermore, in the above embodiments, there is described an example where the number M of varied gradation values composing a set shown in, for example FIG. 7 is 16; however, M is not limited to 16, and may be another value. The video display device according to the present embodiment may be configured to output a variation value P having a value of any of 0 to M−1 in response to a varied gradation value when generating a set of M varied gradation values corresponding to original gradation values. In response to the output variation value P, the video display device can generate a varied gradation value by dividing the sum of an original gradation value and the variation value P by the number M of variation values composing a set of variation value and rounding down the decimal places of the obtained quotient. It is to be noted that there is described an example where the variation value P is an integer; however, the variation value P is not limited to an integer, and, for example, may be a number with a decimal As above, the embodiments are described as an example of the technology according to present disclosure. On that account, the accompanying drawings and detailed description are provided.

Therefore, components described in the accompanying drawings and detailed description may include not only components essential for solving the problems but also components not essential for solving the problems to illustrate the technology. Thus, just because these non-essential components are not described in the accompanying drawings and detailed description does not mean these non-essential components should not be recognized to be essential straightaway.

Furthermore, the above embodiments are provided to illustrate the technology according to present disclosure; therefore, various alterations, replacements, additions, omissions etc. can be made within the scope of the appended claims or the equivalents thereof.

The present disclosure is applicable to various technologies for display a video; for example, it is applicable to project mapping onto a moving object.

The invention claimed is:

1. A video display device comprising:
 a receiver that receives video information including a bit string which defines a gradation value of an input image with a first frame rate;
 a video generator that generates a set of output images including multiple frames corresponding to a one-frame input image on a basis of the received video information; and
 a display that displays the generated output images for each frame at a second frame rate higher than the first frame rate,
 wherein the bit string of the input image includes an upper bit, a middle bit, and a lower bit which are arranged in descending order therein,
 the upper bit corresponds to a number of gradations per frame of the output images, and
 the video generator varies the gradation value among multiple frames in the set of the output images according to the middle bit of the input image, and performs spatial dithering to correct the output images according to the lower bit of the input image.

2. The video display device according to claim 1, wherein the video display device according to claim 1, wherein the video generator calculates a varied gradation value based on a gradation value and a variation value, the gradation value defined by a portion of the bit string from the upper bit to the middle bit in the input image, the variation value varying within a range corresponding to the middle bit, and the varied gradation value indicating a gradation value of each frame in the set of the output images.

3. The videos display device according to claim, wherein the video generator corrects the varied gradation value by applying spatial dithering to a region corresponding to a portion of the input image where the lower bit is a predetermined value.

4. The video display device according to claim 3, wherein the frames in the set of the output images have different variation values from one another, and
 the generator corrects the varied gradation value of a frame having a predetermined variation value on the set of the output images by applying spatial dithering to the frame having the predetermined variation value.

5. The video display device according to claim 4, wherein the video generator changes an order of the frame having the predetermined variation value in the set of the output images for each frame of the input image.

6. The video display device according to claim 1, wherein the video generator performs spatial dithering to correct the output images according to the loser bit, based on a dither pattern indicating a predetermined spatial distribution.

7. The video display device according to claim 6, further comprising a memory that stores therein the dither pattern,
 wherein the video generator performs spatial dithering to correct the output images according to the lower bit, with reference to the dither pattern stored in the memory.

8. The video display device according to claim 6, wherein the dither pattern includes multiple patterns, and
 the video generator sequentially switches a pattern used for each frame of the input image among the multiple patterns.

9. The video display device according to claim 1, further comprising a distance information generator that generates distance information indicating a distance to an object,
 wherein the display is configured by a projection device that projects the output images onto the object, and
 the video generator generates an output image of each frame according to the distance information acquired from the distance information generator.

10. A video display method comprising:
 receiving, by a receiver, video information including a bit string that defines a gradation value of an input image with a first frame rate;
 generating, by a video generator, a set of output images including multiple frames corresponding to a one-frame input image on a basis of the received video information; and
 displaying, by a display, the generated output images for each frame at a second frame rate higher than the first frame rate,
 wherein the bit string of the input image includes an upper bit, a middle bit and a lower bit which are arranged in descending order therein,
 the upper bit corresponds to a number of gradations per frame of the output images, and
 the video generator varies the gradation value among multiple frames in the set of the output images according to the middle bit of the input image, and performs spatial dithering to correct the output images according to the lower bit of the input image.

* * * * *